US008613823B2

(12) United States Patent
Suzuki et al.

(10) Patent No.: US 8,613,823 B2
(45) Date of Patent: Dec. 24, 2013

(54) METHOD OF MANUFACTURING BONDED MEMBER AND BONDED MEMBER MANUFACTURING APPARATUS

(75) Inventors: Takayuki Suzuki, Tokyo (JP); Tomoyuki Saito, Tokyo (JP); Masahiro Nakamura, Tokyo (JP)

(73) Assignee: Origin Electric Company, Limited, Tokyo (JP)

( * ) Notice: Subject to any disclaimer, the term of this patent is extended or adjusted under 35 U.S.C. 154(b) by 379 days.

(21) Appl. No.: 12/981,648

(22) Filed: Dec. 30, 2010

(65) Prior Publication Data

US 2011/0232827 A1 Sep. 29, 2011

(30) Foreign Application Priority Data

Mar. 29, 2010 (JP) ................................ 2010-076277

(51) Int. Cl.
*B32B 37/00* (2006.01)

(52) U.S. Cl.
USPC ........................................... 156/73.6; 264/69

(58) Field of Classification Search
USPC .................. 156/73.1, 73.5, 73.6, 308.2, 580; 264/68, 69
See application file for complete search history.

(56) References Cited

U.S. PATENT DOCUMENTS 6,569,748 B1 * 5/2003 Sakaguchi et al. ............ 438/455
6,825,442 B2 * 11/2004 Schroth et al. ........ 219/137 WM

FOREIGN PATENT DOCUMENTS

JP 08-209076 A 8/1996
JP 2004-082059 A 3/2004
JP 2009-254963 A 11/2009
JP 2010-024321 2/2010

OTHER PUBLICATIONS

Office Action mailed Jul. 2, 2013 issued in corresponding JP Patent Application No. 2010-076277.

* cited by examiner

*Primary Examiner* — James Sells
(74) *Attorney, Agent, or Firm* — Squire Sanders (US) LLP

(57) ABSTRACT

It can prevent extension of the time required for bonding, even when relatively large members are bonded. a bonded member manufacturing apparatus comprises a first holder 11 for holding a first member D, a second holder 12 for holding a second member E, an application device 40 for applying the intermediate substance G to a first bonded surface Df, a moving device 20 for moving the first holder 11 and/or the second holder 12, and a controller. The controller controls the first holder 11, the second holder 12 and the moving device 20 so that a first extended plane De and a second extended plane Ee are arranged such that the first extended plane De and the second extended plane Ee oppose each other in parallel and such that a range where the first bonded surface Df overlaps with the second bonded surface Ef is equal or smaller than a predetermined range when viewed in a direction of the thickness, and then so that the first member D is moved relatively to the second member E in a direction that the range where the first bonded surface Df overlaps with the second bonded surface Ef gradually increases when viewed in the direction of the thickness while maintaining a distance between the first extended plane De and the second extended plane Ee.

5 Claims, 6 Drawing Sheets

METHOD OF MANUFACTURING BONDED MEMBER AND BONDED MEMBER MANUFACTURING APPARATUS

BACKGROUND OF THE INVENTION

1. Technical Field

The present invention relates to a method of manufacturing a bonded member and a bonded member manufacturing apparatus, and particularly relates to a method of manufacturing a bonded member and a bonded member manufacturing apparatus that prevent extension of time required for bonding.

2. Related Art

It is requested that two rectangular plate members be bonded via an adhesive without forming air bubbles therebetween as e.g. in the case of bonding a liquid crystal panel to a protection glass. In general, when circular plate members are to be bonded, it is common to spin the circular plate member at high speed so that a droplet of the adhesive near the center of the circular plate member is spread. However, when the rectangular plate members are to be bonded, it is difficult to spread the adhesive appropriately by spinning the plate member at high speed with the same method that is used for the circular plate members. Therefore, when the rectangular plate members are to be bonded, the following technology is used. The adhesive is applied to the rectangular plate member such that the adhesive that is applied to the rectangular plate member is formed with a main part and four guiding parts. The main part covers a centroid of the rectangular plate member and is extended in a longitudinal direction of the rectangular plate member. Each of the four guiding parts extends from one of the four corners of the main part toward the nearest corner of the rectangular plate member. Then, surfaces of the two rectangular plate members that will be bonded are faced each other, and the adhesive on one of the plate members is brought into contact with the other plate member without forming air bubbles therebetween. The adhesive that is sandwiched between the plate members are then spread (see Patent Document 1, for example).

[Patent Document 1] Japanese Patent Application Publication No. 2010-024321 (paragraph 0043, FIG. 4, etc.)

However, in the case of spreading the adhesive as described above that is sandwiched between the plate members by bringing the plate members into a closer relationship, the time required for spreading the adhesive is extended in proportion to the size of the plate member (by power approximation, for example). Consequently, it takes a long time for a bonding process.

In view of the above problem, the present invention therefore has an object to provide a method of manufacturing a bonded member and a bonded member manufacturing apparatus that can prevent extension of the time required for bonding, even when relatively large members are bonded.

SUMMARY OF THE INVENTION

To achieve the above object, according to aspect (1) of the present invention, referring to FIGS. 3A through 4C, for example, a method of manufacturing a bonded member in which a first member D with which a first bonded surface Df of flat is formed and a second member E with which a second bonded surface Ef of flat is formed are bonded via an intermediate substance GL (see FIG. 2, for example) that has lost fluidity in predetermined thickness, the method comprises an arrangement step (see FIG. 3C) of arranging a first extended plane De and a second extended plane Ee opposing each other in parallel and in such a way that a range where the first bonded surface Df overlaps with the second bonded surface Ef is equal or smaller than a predetermined range when viewed in a direction of the thickness Td, the first extended plane De including the first bonded surface Df and a first virtual plane Ds that is flush with the first bonded surface Df, and the second extended plane Ee including the second bonded surface Ef and a second virtual plane Es that is flush with the second bonded surface Ef; a first application step (see FIG. 4A) of applying the intermediate substance G with fluidity onto the first bonded surface Df; and a movement step (see FIGS. 4A and 4B) of moving the first member D to which the intermediate substance G is applied relative to the second member E while a distance between the first extended plane De and the second extended plane Ee is maintained so that the range where the first bonded surface Df overlaps with the second bonded surface Ef gradually increases when viewed from the direction of the thickness Td. The term "flat" here is typically satisfied with a surface that is considered to be flat overall, which includes an indented surface or a surface with a slit that does not interfere with the movement step, for example. Also, the "predetermined range" typically means a maximum overlapping area in which air bubbles are not formed in the intermediate substance that are sandwiched between the first member and the second member.

It is possible with the above configuration to bond the first bonded surface with the second bonded surface within a time period to slide the first member relatively from a state where the overlapping range between the first bonded surface and the second bonded surface is equal or smaller than the predetermined range to a state where the first bonded surface completely overlaps with the second bonded surface to form the bonded member when viewed in a direction of the thickness.

According to aspect (2) of the present invention, as shown in FIG. 3B, for example, the method of manufacturing a bonded member according to aspect (1) comprises a second application step (see FIG. 3B) of applying the intermediate substance Gp to the second bonded surface Ef before or concurrently with the movement step (see FIG. 4A, for example).

It is possible with the above configuration to prevent formation of a gap between the first bonded surface and the second bonded surface and therefore to prevent formation of air bubbles between the first bonded surface and the second bonded surface when the bonded member is formed.

According to aspect (3) of the present invention, as shown in FIG. 4A, for example, in the method of manufacturing a bonded member according to aspect (1) or (2), the first application step is performed concurrently with the movement step.

It is possible with the above configuration to shorten the processing time.

According to aspect (4) of the present invention, as shown in FIG. 4A, for example, in the method of manufacturing a bonded member according to any one of aspects (1) to (3), the first bonded surface Df is vibrated during the first application step.

It is possible with the above configuration to achieve favorable application.

According to aspect (5) of the present invention, as shown in FIGS. 5A and 5B, for example, in the method of manufacturing a bonded member according to any one of aspects (1) to (4), in the movement step, a film applicator 61 is used to adjust the thickness of the intermediate substance G that is applied in the first application step.

It is possible with the above configuration to smoothly guide the intermediate substance between the first bonded surface and the second bonded surface.

To achieve the above object, according to aspect (6) of the present invention, referring to FIGS. 1A, 1B and 3A through 4C, for example, a bonded member manufacturing apparatus for bonding a first member D and a second member E via an intermediate substance in predetermined thickness, the first member D being formed with a first bonded surface Df of flat and the second member E being formed with a second bonded surface Ef of flat, the bonded member manufacturing apparatus comprises a first holder 11 for holding the first member D; a second holder 12 for holding the second member E; an application device 40 for applying the intermediate substance G with fluidity to the first bonded surface Df; a moving device 20 for moving at least one of the first holder 11 and the second holder 12; and a controller 50 for controlling the first holder 11, the second holder 12 and the moving device 20 so that a first extended plane De (see FIG. 3C, for example), which includes the first bonded surface Df and a first virtual plane Ds (see FIG. 3C, for example) that is flush with the first bonded surface Df, and a second extended plane Ee (see FIG. 3C, for example), which includes the second bonded surface Ef and a second virtual plane Es (see FIG. 3C, for example) that is flush with the second bonded surface Ef, are arranged such that the first extended plane De and the second extended plane Ee oppose each other in parallel and such that a range where the first bonded surface Df overlaps with the second bonded surface Ef is equal or smaller than a predetermined range when viewed in a direction of the thickness, and then so that the first member D is moved relatively to the second member E in a direction that the range where the first bonded surface Df overlaps with the second bonded surface Ef gradually increases when viewed in the direction of the thickness while maintaining a distance between the first extended plane De and the second extended plane Ee (see FIGS. 4A and aB, for example).

It is possible with the above configuration to bond the first bonded surface with the second bonded surface within a time period to slide the first member relatively from a state where the overlapping range between the first bonded surface and the second bonded surface is equal or smaller than the predetermined range to the state where the first bonded surface completely overlaps with the second bonded surface to form the bonded member when viewed in a direction of the thickness.

EFFECT OF THE INVENTION

According to the present invention, it is possible to bond the first bonded surface with the second bonded surface within a time period to slide the first member relatively from a state where the overlapping range between the first bonded surface and the second bonded surface is equal or smaller than the predetermined range to the state where the first bonded surface completely overlaps with the second bonded surface to form the bonded member when viewed in a direction of the thickness.

DETAILED DESCRIPTION OF THE PREFERRED EMBODIMENT

Figure 1A:
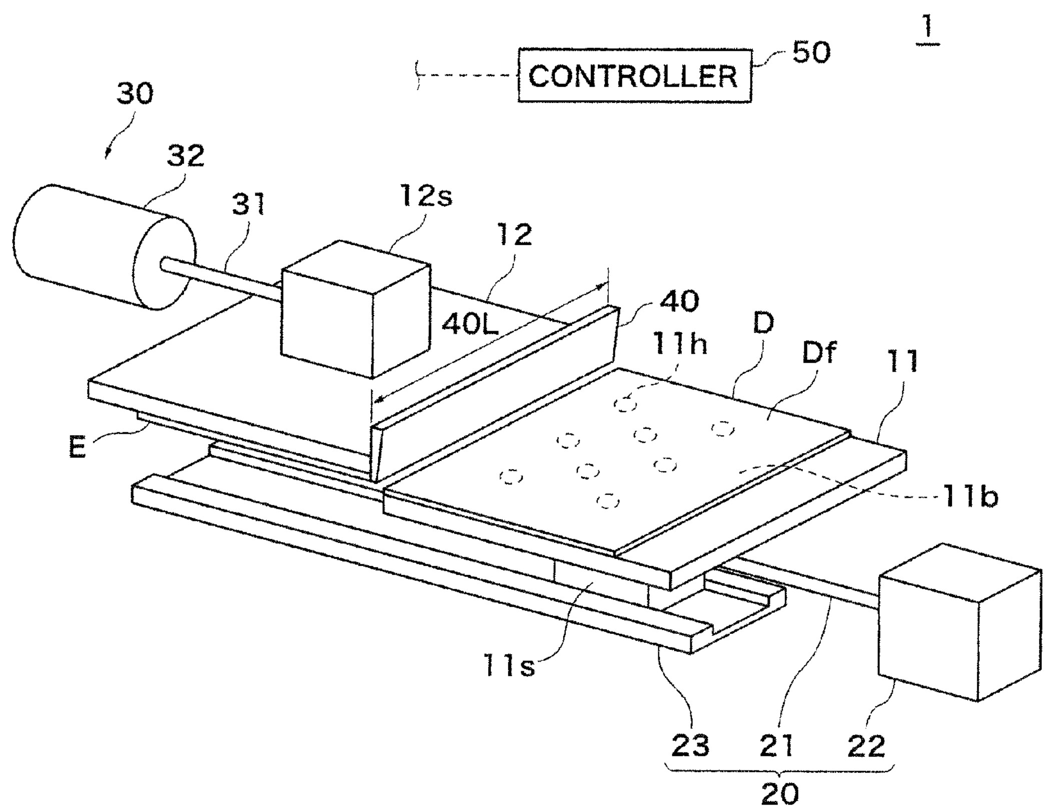
FIG. 1A is a perspective view that shows the schematic configuration of a bonded member manufacturing apparatus according to an embodiment of the present invention

This application is based on the Patent Applications No. 2010-076277 filed on Mar. 29, 2010 in Japan, the contents of which are hereby incorporated in its entirety by reference into the present application, as part thereof.

The present invention will become more fully understood from the detailed description given hereinbelow. Further range of application of the present invention will become clearer from the detailed description given hereinbelow. However, the detailed description and the specific embodiment are illustrated of desired embodiments of the present invention and are described only for the purpose of explanation. Various changes and modifications will be apparent to those ordinary skilled in the art on the basis of the detailed description.

The applicant has no intention to give to public any disclosed embodiment. Among the disclosed changes and modifications, those which may not literally fall within the scope of the patent claims constitute, therefore, a part of the present invention in the sense of doctrine of equivalents.

Description will hereinafter be made of an embodiment of the present invention with reference to the drawings. The same or corresponding members are denoted with the same reference numerals in all the drawings, and their descriptions are not repeated.

Figure 1B:
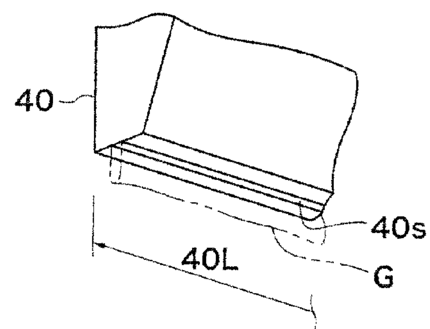
FIG. 1B is a partially enlarged perspective view of a discharge head.

First, referring to FIG. 1, a bonded member manufacturing apparatus 1 according to the embodiment of the present invention will be described. FIG. 1A is a perspective view that shows the schematic configuration of the bonded member manufacturing apparatus 1, and FIG. 1B is a partial perspective view of a discharge head. The bonded member manufacturing apparatus 1 includes: a lower suction stage 11 as a first holder that holds a lower member D as a first member; an upper suction stage 12 as a second holder that holds an upper member E as a second member; a moving device 20 that moves the lower suction stage 11; a discharge head 40 as an application device that discharges an adhesive G (see FIG. 1B) as an intermediate substance; and a controller 50 that controls the operation of the bonded member manufacturing apparatus 1. Before the bonded member manufacturing apparatus 1 is explained in detail, the configuration of a bonded member that is manufactured by the bonded member manufacturing apparatus 1 is exemplified.

Figure 2:
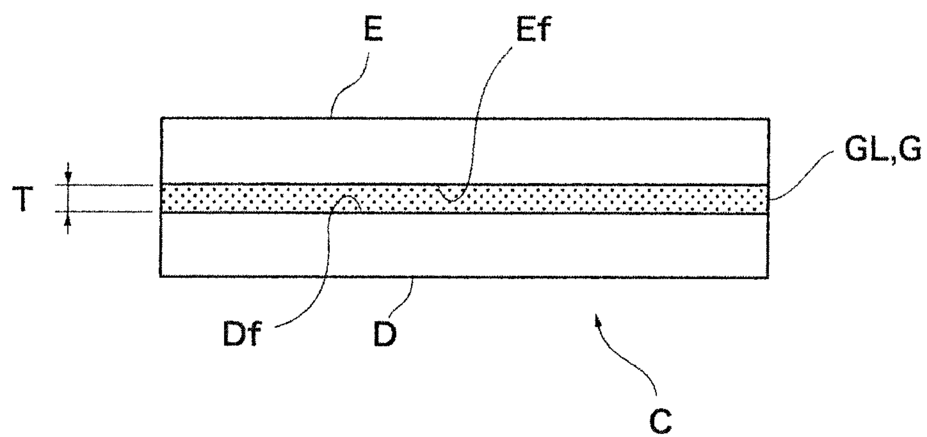
FIG. 2 is an exemplary side view of the configuration of the bonded member.

FIG. 2 is an exemplary side view of the configuration of a bonded member C. The bonded member C is a part that is made up of the lower member D, the upper member E and a layer of the adhesive G (an adhesive layer GL) in predetermined thickness T which is sandwiched between the lower member D and the upper member E. In this embodiment, the lower member D is a liquid crystal panel and the upper member E is a protection glass. However, the lower member D and the upper member E may be members other than the above. The predetermined thickness T is design thickness of the adhesive layer GL in the bonded member C that is either a product or a semi-manufactured product. The adhesive layer GL is formed when the adhesive G, which has fluidity when being discharged from the discharge head 40 (see FIG. 1), loses fluidity with increased viscosity. The adhesive layer GL is typically formed from the hardened adhesive G. In this embodiment, the adhesive G is a liquid substance in which a polymer solid such as a synthetic resin is dissolved in a solvent. The adhesive G is a form of high-molecular substance (polymer) and configured to lose fluidity upon exposure to ultraviolet (UV) light. It is because the viscosity of the adhesive G is increased in response to the intensity of the UV light. The adhesive layer GL bonds the lower member D and the upper member E, and also serves as an interlayer that keeps a predetermined distance (a distance that corresponds to the predetermined thickness T) between the lower member D and the upper member E upon hardening.

The lower member D is formed in a quadrilateral (rectangular or square) plate shape. One of the plate surfaces of the lower member D serves as a lower bonded surface Df that is a first bonded surface contacting the adhesive G. The upper member E is formed in the quadrilateral plate shape. One of the plate surfaces of the upper member E serves as an upper bonded surface Ef that is a second bonded surface contacting the adhesive G. Both of the lower bonded surface Df and the upper bonded surface Ef are formed flat. The term "flat" here is a concept that includes an indented surface and a surface with a slit that do not interfere with parallel movement of the lower member D and/or the upper member E with respect to both of the bonded surfaces Df and Ef while the lower bonded surface Df and the upper bonded surface Ef, which face each other, are spaced by a distance corresponding to the predetermined thickness T. In addition, the lower bonded surface Df and the upper bonded surface Ef are not limited to surfaces that are integrally formed with the lower member D and the upper member E, respectively. For example, for the lower bonded surface Df, a flat surface may be formed by adding another member (that may be hardened adhesive G) to a surface of the lower member D (regardless of being flat or not). In other words, the lower member D that is formed with the lower bonded surface Df can be formed of a plurality of members as long as it can be considered as the single lower member D as a whole. The lower member D and the upper member E are separate components and typically formed from different materials. However, the lower member D and the upper member E may be formed from the same material.

Referring again to FIG. 1, the bonded member manufacturing apparatus 1 is further described. The lower suction stage 11 is configured to suck a reverse surface of the lower bonded surface Df of the lower member D in a vacuum so as to be able to hold the lower member D. The lower suction stage 11 of this embodiment has an outer shape of a quadrilateral plate that is larger than the lower bonded surface Df. A suction surface **11*b* of the lower suction stage 11 that contacts the lower member D is formed with a plurality of air vents 11*h* that are connected to a vacuum pump (not shown). The lower suction stage 11 is adapted to suck the lower member D in a vacuum by operation of the vacuum pump (not shown). A lower support 11*s* in a quadrilateral solid that supports the lower suction stage 11 is attached to the center on the reverse side of the suction surface 11*b* of the lower suction stage 11**.

The upper suction stage 12 is configured to suck a reverse surface of the upper bonded surface Ef (see FIG. 2) of the upper member E in a vacuum so as to be able to hold the upper member E. The upper suction stage 12 is configured the same as the lower suction stage 11 and therefore has the outer shape of a quadrilateral plate. A plurality of air vents (not shown) that are connected to and communicate with the vacuum pump (not shown) are formed on a suction surface that contacts the upper member E. The upper suction stage 12 is adapted to suck the upper member E in a vacuum by operation of the vacuum pump (not shown). An upper support **12*s* in a quadrilateral solid that supports the upper suction stage 12 is attached to the center on the reverse side of the suction surface of the upper suction stage 12. From the perspective of preventing displacement of the lower member D and/or the upper member E held by the lower suction stage 11 and/or the upper suction stage 12, the lower suction stage 11 and/or the upper suction stage 12** may have a guide (not shown) that prevents the lower member D and/or the upper member E from slipping. In addition, the stage that holds the lower member D and/or the upper member E may be formed from a porous plate.

The moving device 20 is configured to include a movable shaft 21, a drive source 22, and a guide rail 23. The movable shaft 21 is a rod-shaped member that mediates between the lower support **11*s* and the drive source 22 and is provided to extend horizontally. One end of the movable shaft 21 is connected to a surface of the lower support 11*s* that is perpendicular to the suction surface 11*b*, and the other end of the movable shaft 21 is inserted and fits in the drive source 22. The drive source 22 is a device that allows the reciprocal movement of the movable shaft 21 in its axial direction (in a horizontal direction). The drive source 22 is configured to input power and convert the input power to mechanical work. The guide rail 23 is a member that limits moving directions of the lower suction stage 11 and is laid linearly so that the lower suction stage 11 reciprocates in a specified straight line. The moving device 20, which is configured as described above, has a position control function that can adjust a moving distance of the movable shaft 21 (and thus the lower suction stage 11**), and pulse control with a servomotor or a stepping motor is typically used for the above control function.

An inverting device 30 is connected to the upper suction stage 12. The inverting device 30 inverts the upper member E that is held by the upper suction stage 12. The inverting device 30 has a rotary shaft 31 and a motor 32. The rotary shaft 31 is a rod-shaped member that mediates between the upper support **12*s* and the motor 32, and is provided to extend horizontally. The rotary shaft 31 has high Young's modulus and a cross sectional shape that increases rigidity of the rotary shaft 31 so that it is not bent even when the weight of the upper suction stage 12, which holds the upper member E, is applied to an end of the rotary shaft 31. One end of the rotary shaft 31 is connected to a surface of the upper support 12*s* that is perpendicular to the suction surface of the upper suction stage 12, while the other end of the rotary shaft 31 is connected to the motor 32. The motor 32 is a device that rotates the rotary shaft 31 about its axis and configured to be able to rotate the rotary shaft 31 in forward and reverse directions with the input power. The inverting device 30 of this embodiment is fixed to a frame (not shown) of the bonded member manufacturing apparatus 1**.

A discharge head 40 is in length 40L, the same length of a side of the lower member D, where the side is perpendicular to the guide rail 23. As shown in the partial detailed view of FIG. 1B, the discharge head 40 is formed with a slit 40*s* that discharges the adhesive G over the length 40L. With the formation of the slit 40*s*, the discharge head 40 can deliver the droplets of the adhesive G in a strip shape over the length 40L. The discharge head 40 is connected to an adhesive reservoir (not shown) separately that retains the adhesive G through a tube (not shown), and is configured to discharge the adhesive G when the adhesive G is delivered from the adhesive reservoir (not shown) at appropriate timing by operation of an adhesive transferring device (not shown). The discharge head 40 is disposed in the proximity of a side of the upper suction stage 12 on a lower suction stage 11 side in a manner that the slit 40*s* is perpendicular to the guide rail 23.

The controller 50 is connected to a vacuum pump (not shown) that communicates with the plurality of air vents 11*h* that are formed in the suction surface 11*b* of the lower suction stage 11 and also to a vacuum pump (not shown) that communicates with the plurality of air vents that are formed in the suction surface of the upper suction stage 12 through signal cables respectively, and is configured to be able to control presence and absence of vacuum suction of the lower member D and the upper member E respectively. In addition, the controller 50 is connected to the moving device 20 via the signal cable, and is configured to be able to control the moving distance and movement timing of the movable shaft 21. The controller 50 is also connected to the inverting device 30 via the signal cable, and is configured to be able to control the rotary action of the rotary shaft 31. Moreover, the controller 50 is connected to the adhesive transferring device (not shown) via the signal cable, and is configured to be able to control a discharge rate of (also control not to discharge) the adhesive G from the discharge head 40. The bonded member manufacturing apparatus 1 has a UV irradiator that emits the UV light (not shown in FIG. 1). The controller 50 is connected to the UV irradiator (not shown) via the signal cable, and is configured to be able to control presence and absence of irradiation of the UV light.

Figure 3A:
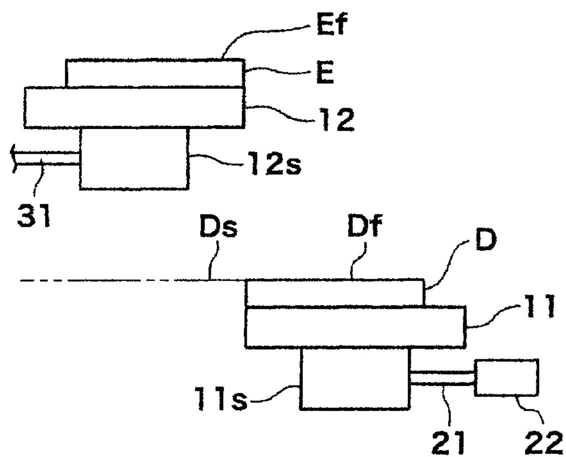
FIG. 3A through FIG. 3C are views each of which illustrates a state of the bonded member manufacturing apparatus in the first half of a manufacturing process for the bonded member.
Figure 3B:
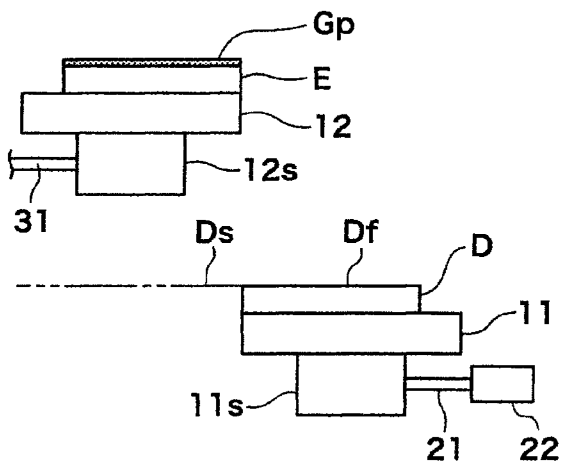
Figure 3C:
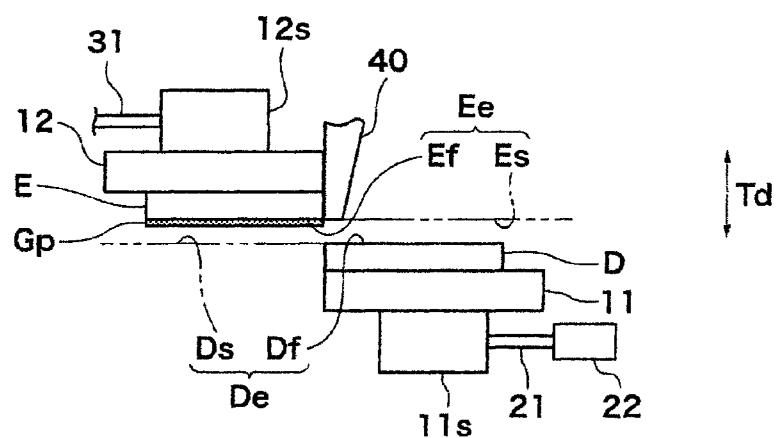
Figure 4A:
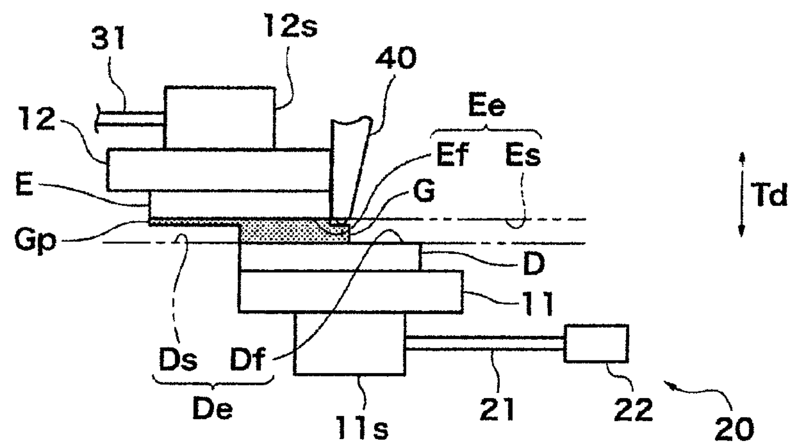
FIG. 4A through FIG. 4C are views each of which illustrates a state of the bonded member manufacturing apparatus in the latter half of the manufacturing process for the bonded member.
Figure 4B:
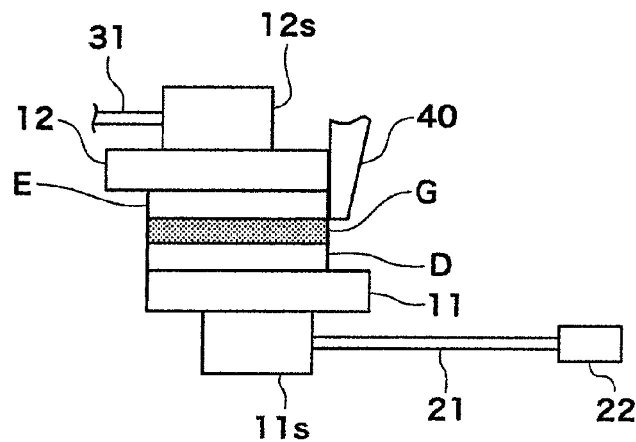
Figure 4C:
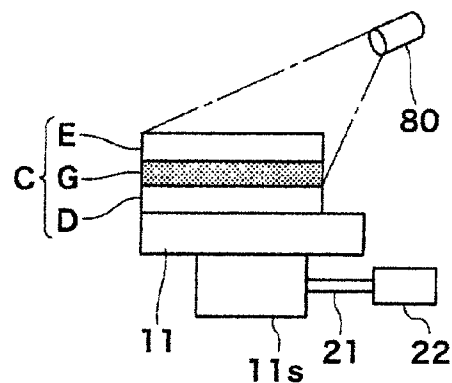

Continually referring to FIG. 3A through FIG. 3C and FIG. 4A through FIG. 4C, the action of the bonded member manufacturing apparatus 1 is now described. FIG. 3A thorough FIG. 3C are views that illustrate a state of the bonded member manufacturing apparatus 1 in the first half of a manufacturing process for the bonded member C. FIG. 4A through FIG. 4C are views that illustrate a state of the bonded member manufacturing apparatus 1 in the latter half of the manufacturing process for the bonded member C. The process of manufacturing the bonded member C by the bonded member manufacturing apparatus 1 is one embodiment of the present invention in which a method of manufacturing a bonded member is embodied. When a reference is made to the configuration of the bonded member manufacturing apparatus 1 or the structure of the bonded member C in the following description, FIG. 1A, FIG. 1B and FIG. 2 will be referred to appropriately. In preparation for manufacturing the bonded member C, the suction surface of the upper suction stage 12 is turned up. Here, since the movable shaft 21, which is connected to the lower support 11*s*, does not rotate axially in this embodiment, the suction surface 11*b* of the lower suction stage 11 always faces upward.

When it is confirmed that the suction surface of the upper suction stage 12 faces upward, a robot (not shown) grabs one of the lower members D in a tray (not shown) in which the lower members D that are prepared in the previous step are stored, and places the lower member D on the suction surface 11*b* with the lower bonded surface Df facing upward. The controller 50 starts operating the vacuum pump (not shown) that communicates with the plurality of air vents 11*h* after the lower member D is placed on the suction surface 11*b*, and then sucks and holds the lower member D with the suction surface 11*b*. Meanwhile, a robot (not shown) grabs one of the upper members E in a tray (not shown) in which the upper members E that are prepared in the previous step are stored, and places the upper member E on the suction surface of the upper suction stage 12 with the upper bonded surface Ef facing upward. The controller 50 starts operating the vacuum pump (not shown) that communicates with the plurality of air vents that are formed in the suction surface of the upper suction stage 12 after the upper member E is placed on the suction surface of the upper suction stage 12, and then sucks and holds the upper member E with the suction surface of the upper suction stage 12 (see FIG. 3A).

When the upper member E is sucked and held by the upper suction stage 12, the liquid adhesive G (the adhesive G that is applied in advance to the bonded surface may hereinafter be designated with the reference numeral "Gp" for distinction) is applied all over the upper bonded surface Ef to form a coating (the second application step, see FIG. 3B) before the upper member E is bonded to the lower member D. The coating is one of the forms of application. The adhesive Gp that is applied to (pre-coated on) the upper bonded surface Ef in advance is thinner than the predetermined thickness T and should not drip even when the upper bonded surface Ef faces downward. The adhesive Gp should be in an amount that makes it possible to smoothly bond the upper bonded surface Ef with the lower member D in the following step. The coating Gp is typically formed by die coating. Since the adhesive Gp that is pre-coated on the upper bonded surface Ef has fluidity and is later integrated with the adhesive G that is applied to the lower bonded surface Df, the adhesive GP does not become a part of the upper member E. Therefore, an interface of the upper member E that contacts the adhesive Gp remains to be the upper bonded surface Ef. Once the coating GP is formed, the controller 50 rotates the rotary shaft 31 of the inverting device 30 to invert the upper member E to make the upper bonded surface Ef face downward. With this inversion, although the lower bonded surface Df and the upper bonded surface Ef are displaced each other in the horizontal direction (in a direction parallel with both of the bonded surfaces Df and Ef), they face each other in parallel (the arrangement step, see FIG. 3C).

A further detailed description is given on a state in which the lower bonded surface Df is parallel with and faces the upper bonded surface Ef (FIG. 3C). About the lower member D, a lower virtual surface Ds (first virtual plane) that is an imaginary plane adjacent to the lower bonded surface Df is provided to the upper member E side on the same level as the lower bonded surface Df. That is, surface Ds is beneath the upper member E and is flush with surface Df. It defines the surface which consists of the lower bonded surface Df and the lower virtual surface Ds as a lower extended surface De (first extended plane). Meanwhile, about the upper member E, an upper virtual surface Es (second virtual plane) that is an imaginary plane adjacent to the upper bonded surface Ef is provided on the lower member D side on the same level as the upper bonded surface Ef. That is, surface Es is above surface Df and is flush with surface Ef. It defines the surface which consists of the upper bonded surface Ef and the upper virtual surface Es as an upper extended surface Ee (second extended plane). The state shown in FIG. 3C in which the lower bonded surface Df and the upper bonded surface Ef are parallel with and face each other while being displaced each other in the horizontal direction is a state in which the lower extended surface De and the upper extended surface Ee are parallel with and face each other. In this embodiment, the lower bonded surface Df and the upper virtual surface Es face are parallel with and each other, and the upper bonded surface Ef and the lower virtual surface Ds are parallel with and face each other. At this time, when viewed in a thickness direction Td, or in other words, when viewed in a direction perpendicular to the lower bonded surface Df (viewed from the top in this embodiment), the upper bonded surface Ef does not overlap with the lower bonded surface Df.

In this embodiment, due to the configuration of the inverting device 30, (a part of) the upper member E temporarily moves below the lower virtual surface Ds when the upper member E is inverted. Therefore, in order to avoid hitting the lower member D with the upper member E, the lower bonded surface Df and the upper bonded surface Ef are arranged such that the upper bonded surface Ef does not overlap with the lower bonded surface Df when viewed in the thickness direction Td. However, if a problem such as hitting the lower member D with the lower member E is not present, the lower bonded surface Df and the upper bonded surface Ef may be arranged such that the upper bonded surface Ef overlaps with the lower bonded surface Df within a predetermined range when viewed in the thickness direction Td. Here, the "predetermined range" means a maximum range in which the adhesive G can be supplied appropriately without air bubbles being taken in between the lower bonded surface Df and the upper bonded surface Ef. To appropriately supply the adhesive G typically means that the adhesive G between the lower member D and the upper member E is not insufficiently supplied and that the air bubbles are not taken in between the lower member D and the upper member E when the bonded member C is formed. Examples in which the upper bonded surface Ef overlaps with the lower bonded surface Df within the predetermined range include: a case where the upper bonded surface Ef to which the adhesive Gp is pre-coated overlaps in a linear manner with the lower bonded surface Df to which the adhesive G is applied, without the air bubbles being taken in; and a case where the adhesive G that is supplied to a gap between the lower bonded surface Df to which the adhesive G is not applied and the upper bonded surface Ef to which the adhesive Gp is pre-coated is spread in a capillary action without the air bubbles being taken in. In a case where the upper bonded surface Ef overlaps with the lower bonded surface Df when viewed in the thickness direction Td, if the lower bonded surface Df is brought into contact with the upper bonded surface Ef and they are separated from each other, there is an advantage that a distance (gap) between the bonded surfaces Df and Ef can be set easily.

In the arrangement step of this embodiment, a distance between the lower extended surface De and the upper extended surface Ee is set to be equal to the thickness T of the adhesive layer GL when the bonded member C is formed. Moreover, in view from a direction that the guide rail 23 extends (a side view when what is shown in FIG. 3C is a front view), the upper member E and the lower member D are vertically arranged. When the lower member D and the upper member E are arranged as above, the discharge head 40 is disposed, as shown in FIG. 3C, such that the longitudinal direction of the discharge head 40 lies along the side of the upper member E on the upper virtual surface Es side. At this time, the discharge head 40 is disposed such that the lower end thereof does not contact the lower member D.

After the discharge head 40 is disposed, the controller 50 drives the movable shaft 21 of the moving device 20 to move the lower member D toward the upper member E along the guide rail 23 (beginning of the movement step). When the lower bonded surface Df moves immediately below the slit 40*s* of the discharge head 40, the controller 50 starts supplying the adhesive G to the lower bonded surface Df by making the discharge head 40 discharge the liquid adhesive G (beginning of the first application step). The supply of the adhesive G to the lower bonded surface Df is one embodiment of application. The adhesive G that is supplied to the lower bonded surface Df in the linear manner is filled in the gap that is formed between the lower bonded surface Df and the upper bonded surface Ef when the adhesive G is located below the upper bonded surface Ef by the movement of the lower member D. At this time, since the liquid adhesive Gp is pre-coated on the upper bonded surface Ef beforehand, a range that the adhesive G, which is supplied to the lower bonded surface Df, contacts the adhesive Gp, which is pre-coated on the upper bonded surface Ef, promptly spreads from a dotted state to a planar state through a linear state. When the pre-coated adhesive Gp contacts the adhesive G that is supplied to the lower bonded surface Df, the adhesive Gp is mixed with the adhesive G to be blended together. Consequently, there is no longer a distinction between the pre-coated adhesive Gp and the adhesive G supplied to the lower bonded surface Df. The lower member D keeps moving until it is set in a position where the lower member D and the upper member E are combined to form the bonded member C. The liquid adhesive G keeps being discharged from the discharge head 40 until the lower bonded surface Df moves from the position right below the slit 40*s* (see FIG. 4A to FIG. 4B). During the movement step, the gap between the lower extended surface De and the upper extended surface Ee is maintained to correspond with the thickness T, which is set in the arrangement step. As described above, the range in which the upper bonded surface Ef overlaps with the lower bonded surface Df when viewed in the thickness direction Td gradually increases. Therefore, the lower member D and the upper member E are bonded via the adhesive G without taking in the air bubbles.

At this time, the time required to fill the gap between the lower bonded surface Df and the upper bonded surface Ef with the adhesive G is satisfied with the time required to slide the lower member D. In this embodiment, this time period is generally proportional to the length of the member in a moving direction if a moving speed of the lower member D is constant. Compared to the case where both of the members are pressed against each other to spread the adhesive G (press spread method), in the conventional press spread method, in regard to a bonded surface of the member that is to be bonded, the rougher surface the member has or the greater contact angle to the liquid adhesive the member has, the longer a time to spread the adhesive is required. Consequently, the time is extended in proportion to the size of the member by power approximation or exponential approximation. In this embodiment, the required time period is extended in proportion to the size of the member. Therefore, compared to the conventional press spread method, particularly the greater size of the member prominently shortens the time required to bond the members.

After the lower member D finishes moving, the controller 50 cancels sucking and holding of the upper member E by the upper suction stage 12 and moves the lower suction stage 11 to a position where the lower suction stage 11 was located before the movement step. Then, a UV irradiator 80 emits the UV light on the adhesive G that is located between the lower member D and the upper member E (see FIG. 4C). The adhesive G loses fluidity by irradiation of the UV light and then is hardened. Accordingly, the lower member D and the upper member E are bonded via the adhesive layer GL to form the bonded member C. Once the bonded member C is produced, the controller 50 cancels sucking and holding of the lower member D (the bonded member C) by the lower suction stage 11. After the sucking and holding of the lower member D (the bonded member C) is canceled, the robot (not shown) grabs the bonded member C to transfer it to the next step. The production of the single bonded member C is completed at this point, and the above actions are repeated.

In the above first application step, the lower bonded surface Df (the lower member D) to which the adhesive G is supplied may be vibrated. By vibrating the lower bonded surface Df when the adhesive G is supplied, spreading of the adhesive G can be promoted, and thus, more smooth and favorable application of the adhesive G can be achieved. The lower bonded surface Df may be vibrated in a direction parallel to the lower bonded surface Df or particularly in a direction that the lower member D moves (a direction that the guide rail 23 extends). As the configuration to cause a vibration, an ultrasonic vibrator may be provided to the lower suction stage 11 to cause ultrasonic vibration of the lower member D. Meanwhile, a drive force that moves the lower member D in parallel with the upper member E is considered to be proportional to a frictional force (shear force) on the interface between the lower member D and the adhesive G that is caused by the viscosity of the adhesive G. However, the frictional force can be reduced by the vibration, and thus the required drive force can be reduced.

Figure 5A:
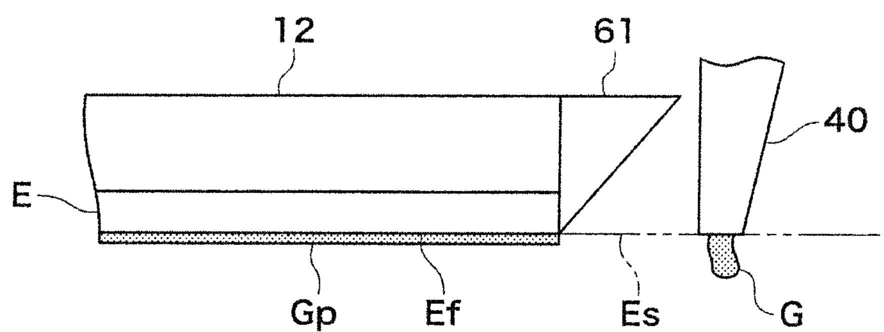
FIG. 5A and FIG. 5B are side views each of which illustrates an application state of a film applicator.
Figure 5B:
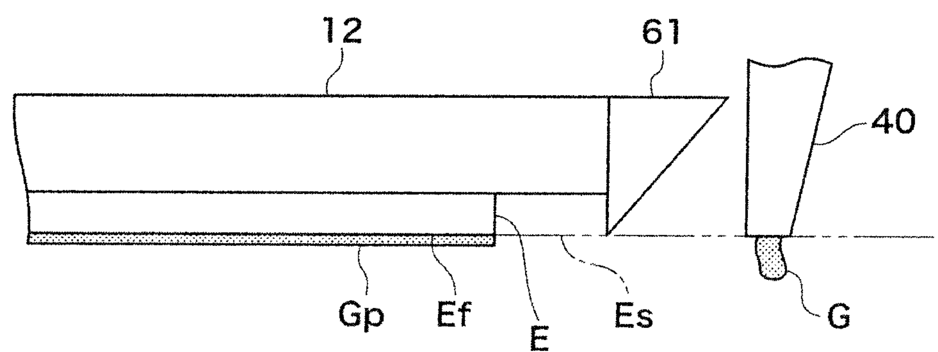

In addition, as shown in FIG. 5, in the movement step, a film applicator 61 that evens out the thickness of the dripped adhesive G may be used to appropriately fill the liquid adhesive G that is dripped onto the lower bonded surface Df in between the lower member D and the upper member E. An example shown in FIG. 5A is applied to a case where the side of the upper member E on the lower member D side conforms with the side of the upper suction stage 12 in the horizontal direction. In this case, the film applicator 61 is attached to the end of the side of the upper member E on the lower member D side such that a point on the surface (which evens out the adhesive G) that opposes the lower bonded surface Df (the surface to which the adhesive G is applied) departs from the lower bonded surface Df as a point on the surface departs from the upper member E. Meanwhile, in an example shown in FIG. 5B, the upper suction stage 12 protrudes from the upper member E on the lower member D side in the horizontal direction. In this case, the film applicator 61 is attached to the end of the side of the upper suction stage 12 on the lower member D side. In both of the embodiments to attach the film applicator 61 that are shown in FIGS. 5A and 5B, the film applicator 61 is attached such that the lower end thereof coincides with the upper bonded surface Ef. However, the film applicator 61 may be attached such that the lower end thereof does not contact the lower member D. From a perspective of contacting the adhesive G that is applied on the lower bonded surface Df and evened out by the film applicator 61 with the adhesive Gp that is pre-coated on the upper bonded surface Ef, it is preferred that the film applicator 61 be attached such that the lower end thereof does not protrude downwardly from the upper virtual surface Es.

In the above description, the adhesive G contains a UV curable resin as its main component. However, the adhesive G may be of a thermosetting type or a type that is hardened over time at room temperature. In addition, other than the type that is completely hardened, the adhesive G may be of a partially-hardened type such as a gel (a type that is elastically deformed with application of an external force but returns to the original shape when the external force is released). Moreover, it is described that the intermediate substance is the adhesive G, which is a form of polymer. However, the intermediate substance may be a metal such as solder or a partially-hardened substance such as a liquid crystal. In other words, the intermediate substance that is suited for bonding the lower member D and the upper member E should be used.

In the above description, the lower member D and the upper member E are formed in the quadrilateral plate shape. However, as long as the flat bonded surfaces are formed, the lower member D and the upper member E may be formed in a planar shape other than the quadrilateral shape such as a circular or oval shape. In addition, projections and depressions may be formed on the backside of the bonded surfaces that surpass predetermined thickness.

In the above description, the adhesive G is applied to the entirety of the upper bonded surface Ef to form the pre-coating layer Gp before the upper member E is bonded with the lower member D. However, the pre-coated adhesive may be of a different component from the one that is supplied to the lower member D such as a component that is hardened by being mixed with the adhesive G that is supplied to the lower member D, for example. Or, the adhesive may not be applied to the upper bonded surface Ef before the upper member E is bonded with the lower member D. At this time, if the adhesive G that is supplied to the lower bonded surface Df does not conform well with the upper bonded surface Ef and thus the bonding is not performed smoothly, the upper bonded surface Ef may be vibrated or the upper bonded surface Ef may be finished beforehand in order to improve affinity for the adhesive.

In the above description, the adhesive G is pre-coated beforehand on the entirety of the upper bonded surface Ef before the bonding with the lower member D, and the adhesive G is supplied onto the lower bonded surface Df in the first application step. However, the adhesive G may be pre-coated on the lower bonded surface Df, and the adhesive G may be supplied onto the upper bonded surface Ef (in this case, the upper member E corresponds to the first member, and the lower member D corresponds to the second member). In other words, in the above description, the first member is the lower member D, and the second member is the upper member E. However, the first member may be the upper member E, and the second member may be the lower member D (the same applies to the application of each of modifications described below). Also, the second application step is not limited to the case where the adhesive is applied to the entirety of the upper bonded surface Ef before the arrangement step in which the lower extended surface De opposes the upper extended surface Ee. Instead, the second application step may be simultaneously performed with the movement step, like the above-mentioned first application step.

Figure 6A:
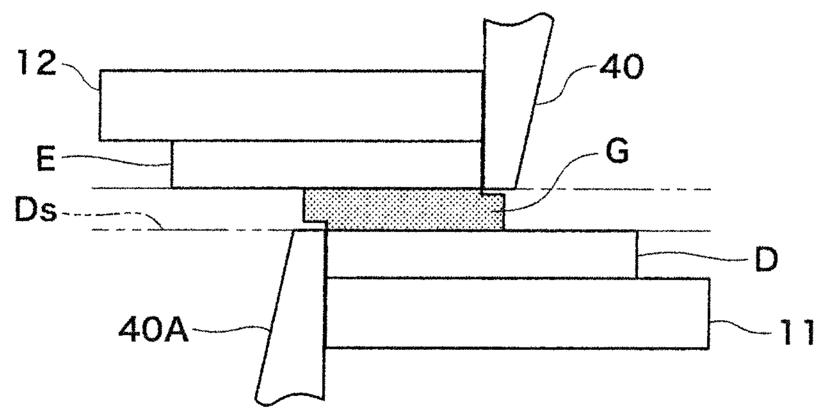
FIG. 6A is a side view that shows a modified example of application of an adhesive to the member, in which the adhesive is provided from the discharge head to both of the bonded surfaces.
Figure 6B:
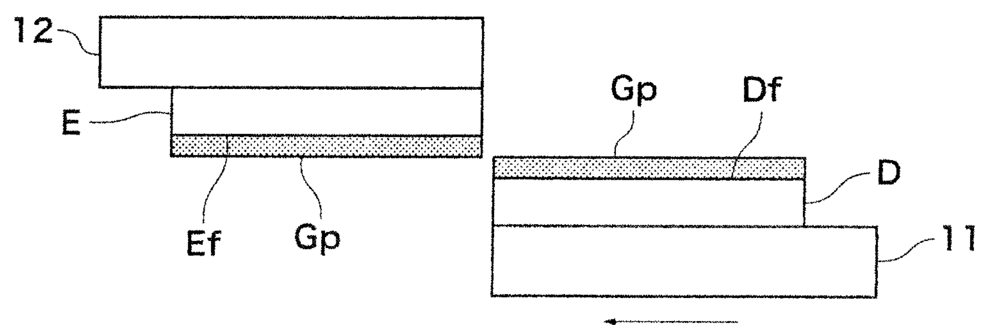
FIG. 6B is a side view that shows a modified example of application of an adhesive to the member, in which a precoating of the adhesive is formed on both of the bonded surfaces.

FIG. 6A shows a state where the second application step is simultaneously performed with the movement step, like the first application step. In this case, in addition to the discharge head 40, a discharge head 40A that has the same configuration as the discharge head 40 is disposed adjacent to the side of the lower member D on the lower virtual surface Ds side along the longitudinal direction. At this time, the discharge head 40A is disposed such that the upper end thereof does not contact the upper member E. It is preferred that the second application step be simultaneously performed with the movement step, because the process time can be shortened. Or, it is possible as shown in FIG. 6B that an amount of the adhesive G that makes the predetermined thickness T is applied to both of the lower bonded surface Df and the upper bonded surface Ef to form the pre-coating layers Gp, and then, both of the members D and E are slid to be bonded. Consequently, it is possible to reduce waste of the adhesive G by preventing the extrusion of the adhesive G. In addition, although not shown, it is possible to increase a speed to spread the adhesive G by applying the pre-coating layers Gp such as that shown in FIG. 6B to the lower bonded surface Df and the upper bonded surface Ef, and then providing the adhesive G in between both of the members D and E such as that shown in FIG. 6A. As described above, depending on a situation such as roughness of the bonded surfaces, the component of the adhesive, or the like, the adhesive G can be pre-coated all over on the bonded surfaces before both of the members D and E are overlapped each other viewed in the thickness direction Td, or can be supplied by dripping to a part of the bonded members. Alternatively, both of the above application forms can be adopted. In addition, depending on the situation, it is possible to select whether the adhesive is applied to either one of the lower member D and the upper member E or to both of the lower member D and the upper member E. However, from a perspective of shortening the process time, it is preferable that one of the bonded surfaces be pre-coated with the adhesive while the other of the bonded surfaces is supplied with the adhesive during the movement step. Meanwhile, from a perspective of increasing a speed to spread the adhesive, it is preferable that both of the bonded surfaces be pre-coated with the adhesive and that the adhesive be supplied while one of the bonded surfaces is moved toward the other, if necessary. The order of the first application step, the second application step, and the arrangement step may be changed appropriately.

In the above description, the distance between the lower extended surface De and the upper extended surface Ee in the arrangement step is equal to the thickness T of the adhesive layer GL when the bonded member C is formed. However, from the arrangement step to the movement step, the above distance may differ from a distance that corresponds to the thickness T of the adhesive layer GL. Then, upon completion of the movement step, the lower member D may approach or separate from the upper member E to adjust the distance between the lower bonded surface Df and the upper bonded surface Ef to the predetermined thickness T. However, if the distance between the lower extended surface De and the upper extended surface Ee is adjusted to correspond to the predetermined thickness T in the arrangement step, the process time can be shortened and the supply of the adhesive G can be optimized in terms of the supplied amount and the supplied timing. Microscopically, after the completion of the movement step and during the period when the adhesive G is hardened, it is presumable that the distance between both of the bonded surfaces Df and Ef may be changed due to expansion or contraction of the adhesive G. However, when such a change is within an allowable error range with respect to the design dimension of the bonded member C as a finished product or an interim product, it should be regarded that there is no change in the distance between both of the bonded surfaces Df and Ef.

In the above description, the first application step and the movement step are performed simultaneously. However, an amount of the adhesive G that corresponds to the volume of the adhesive layer GL when the bonded member C is formed may be applied in advance during the first application step, and then the process may proceed to the movement step upon completion of the first application step. However, if the first application step and the movement step are performed simultaneously, the process time can preferably be shortened.

In the above description, in the first application step, the liquid adhesive G is discharged linearly from the discharge head 40 that is formed with the slit 40*s*. However, instead of the discharge head 40 that is formed with the slit 40*s*, a nozzle that discharges the adhesive G in a dotted manner may be moved appropriately to apply the adhesive G linearly or in multiple dots as in the case where the discharge head 40 is used (in this case, the movement step is typically initiated after completion of the first application step). When the adhesive G is applied in multiple dots, a plurality of nozzles may be arranged horizontally in a direction perpendicular to the movement direction of the lower member D.

In the above description, during the first application step, the liquid adhesive G is discharged from the discharge head 40 and is supplied to the lower bonded surface Df. However, a sheet of a synthetic resin (intermediate substance) may be placed on the lower bonded surface Df and be melted by heating so as to obtain fluidity. As described above, the term "application" includes a case where the intermediate substance without fluidity will obtain fluidity when the lower bonded surface Df overlaps with the upper bonded surface Ef from the thickness direction Td.

In the above description, during the movement step the lower member D is moved without moving the upper member E. However, the upper member E may be moved without moving the lower member D. Alternatively, both of the lower member D and the upper member E may be moved.

In the above description, the lower member D is bonded with the upper member E in a state where both of the bonded surfaces Df and Ef are horizontal. However, the lower member D may be bonded with the upper member E in a state where the bonded surfaces Df and Ef are not horizontal but vertical, for example.

The use of the terms "a" and "an" and "the" and similar referents in the context of describing the invention (especially in the context of the following claims) is to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

Preferred embodiments of this invention are described herein, including the best mode known to the inventors for carrying out the invention. Variations of those preferred embodiments may become apparent to those of ordinary skill in the art upon reading the foregoing description. The inventors expect skilled artisans to employ such variations as appropriate, and the inventors intend for the invention to be practiced otherwise than as specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

Description of Reference Numerals and Symbols

1 bonded member manufacturing apparatus
11 lower suction stage (first holder)

12 upper suction stage (second holder)
20 moving device
40 discharge head (application device)
50 controller
61 film applicator
C bonded member
D lower member (first member)
Df lower bonded surface (first bonded surface)
Ds lower virtual surface (first virtual plane)
De lower extended surface (first extended plane)
E upper member (second member)
Ef upper bonded surface (second bonded surface)
Es upper virtual surface (second virtual plane)
Ee upper extended surface (second extended plane)
G adhesive (intermediate substance)
GL adhesive layer (intermediate substance (loss of fluidity))
T predetermined thickness
Td thickness direction

What is claimed is:

1. A method of manufacturing a bonded member in which a first member with which a first bonded surface of flat is formed and a second member with which a second bonded surface of flat is formed are bonded via an intermediate substance that has lost fluidity in predetermined thickness, the method comprising:

an arrangement step of arranging a first extended plane and a second extended plane opposing each other in parallel and in such a way that a range where the first bonded surface overlaps with the second bonded surface is equal or smaller than a predetermined range when viewed in a direction of the thickness, the first extended plane including the first bonded surface and a first virtual plane that is flush with the first bonded surface, and the second extended plane including the second bonded surface and a second virtual plane that is flush with the second bonded surface;

a first application step of applying the intermediate substance with fluidity onto the first bonded surface; and a movement step of moving the first member to which the intermediate substance is applied, relatively to the second member so that the range where the first bonded surface overlaps with the second bonded surface gradually increases when viewed from the direction of the thickness while a distance between the first extended plane and the second extended plane is maintained and the intermediate substance is filled in a gap formed between the first bonded surface and the second bonded surface.

2. The method of manufacturing a bonded member according to claim 1, comprising a second application step of applying the intermediate substance to the second bonded surface before or concurrently with the movement step.

3. The method of manufacturing a bonded member according to claim 1, wherein the first application step is performed concurrently with the movement step.

4. The method of manufacturing a bonded member according to claim 1, wherein the first bonded surface is vibrated during the first application step.

5. The method of manufacturing a bonded member according to claim 1, wherein in the movement step, a film applicator is used to adjust the thickness of the intermediate substance that is applied in the first application step.

* * * * *